United States Patent [19]

Stary et al.

[11] 4,063,874

[45] Dec. 20, 1977

[54] VAPOR BURNING APPARATUS

[75] Inventors: Marvin L. Stary; Edward L. Brown, both of Claremont; Eric L. Pridonoff, Pasadena, all of Calif.

[73] Assignee: Clean Air Engineering, Inc., Anaheim, Calif.

[21] Appl. No.: 655,967

[22] Filed: Feb. 6, 1976

Related U.S. Application Data

[63] Continuation-in-part of Ser. No. 612,781, Sept. 12, 1975.

[51] Int. Cl.² .............. F23D 13/24; F23D 13/20; F23D 15/00
[52] U.S. Cl. .......................... 431/350; 431/5; 431/202; 431/351; 141/45
[58] Field of Search .......... 431/351, 5, 348, 7, 431/2, 12, 8, 10, 115, 350, 202; 55/88, 387; 141/1, 41–45, 52, 59, 82, 98, 287, 290, 303, 392; 220/855, 85 US, 85 UR; D23/129

[56] References Cited

U.S. PATENT DOCUMENTS

| D. 103,732 | 3/1937 | Matthews et al. | D23/129 |
| 2,622,670 | 12/1952 | Williams | 431/348 |
| 3,366,156 | 1/1968 | Belknap | 431/348 |
| 3,520,646 | 7/1970 | Matsuda | 431/351 X |
| 3,817,687 | 6/1974 | Cavallero et al. | 431/5 X |
| 3,897,193 | 7/1975 | Kattan et al. | 431/5 |
| 3,907,010 | 9/1975 | Burtis et al. | 141/45 |
| 3,914,095 | 10/1975 | Straitz | 431/202 |
| 3,926,230 | 12/1975 | Stary et al. | 141/45 |

Primary Examiner—Edward G. Favors
Assistant Examiner—Larry Jones
Attorney, Agent, or Firm—William P. Green

[57] ABSTRACT

A burner which is capable of burning a very lean mixture of flammable vapors and air, and which preferably also can burn a mixture of varying richness and B.T.U. content, with the burner desirably including a structure forming an upwardly facing recess and an inlet for introducing the vapor-air mixture into a lower portion of that recess in a relation enabling the mixture, when lean, to burn at least partially in the recess in isolation from external air, and when richer to burn at an upper elevation at which external air can mix with the basic vapor-air mixture.

12 Claims, 5 Drawing Figures

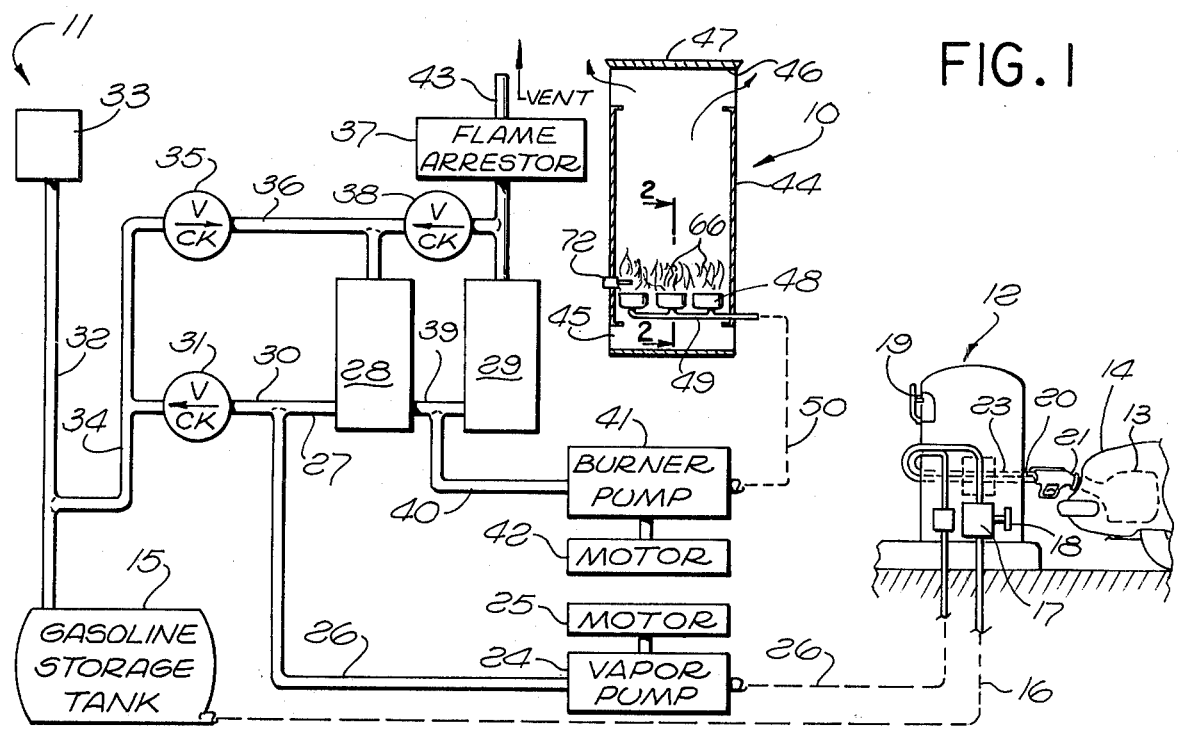
FIG. 1
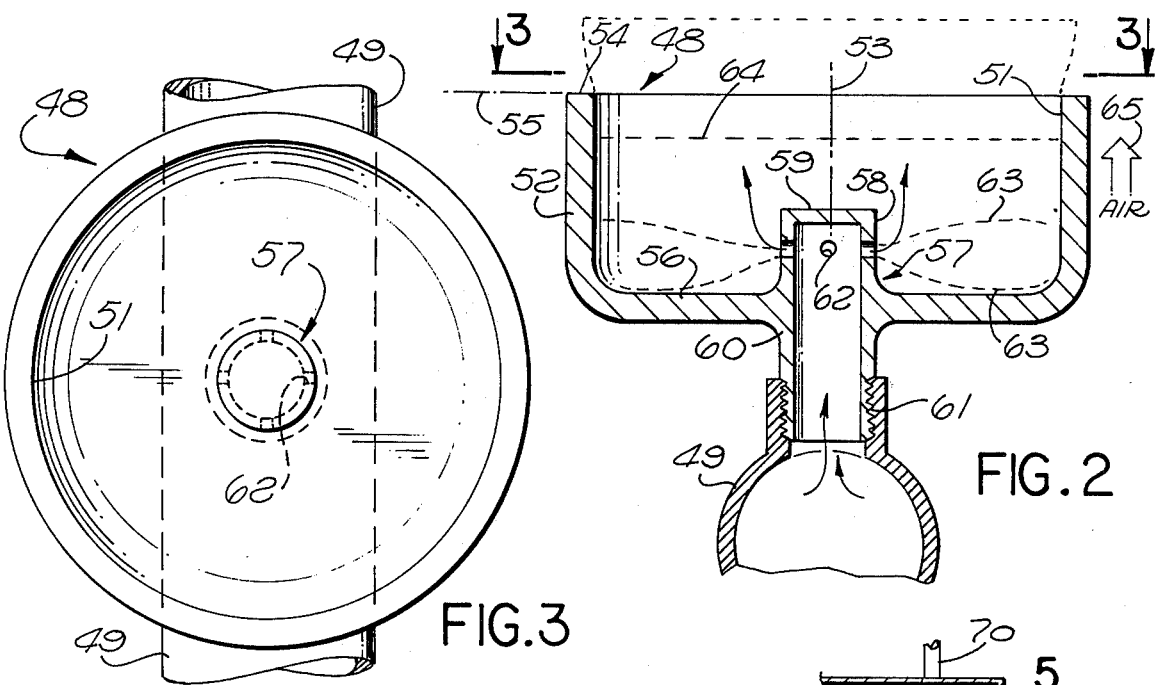
FIG. 2
FIG. 3
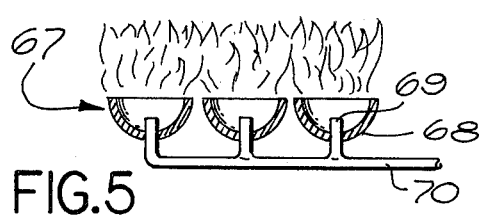
FIG. 5
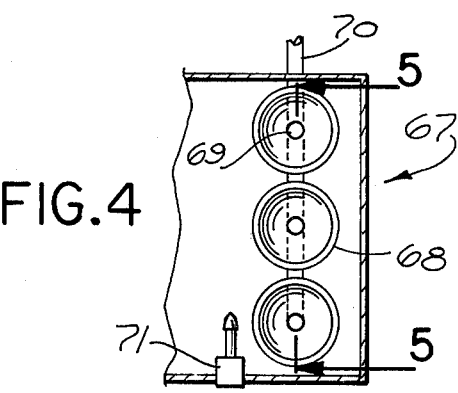
FIG. 4

VAPOR BURNING APPARATUS

CROSS-REFERENCE TO RELATED APPLICATION

This application is a continuation-in-part of prior U.S. patent application Ser. No. 612,781 filed Sept. 12, 1975.

BACKGROUND OF THE INVENTION

This invention relates to improved burner apparatus for burning a mixture of flammable vapors and air.

There are various types of situations in which it may become desirable to burn a mixture of flammable vapors, such as gasoline vapors, and air, which mixture may under at least some operating conditions be extremely lean and thus difficult to burn in a conventional burner arrangement, or which may vary under different operating circumstances from such a lean condition to a relatively rich condition of vastly increased B.T.U. content. One such situation is in apparatus such as that shown for example in U.S. Pat. No. 3,897,193 in which gasoline vapors are collected from the vicinity of a dispensing nozzle while fuel is delivered through that nozzle into a vehicle tank or other tank at a service station. The vapors thus collected may at some times be in a very lean mixture with air, particularly where as in that patent some of the vapors may initially be collected on an adsorbent bed and then subsequently desorbed from that bed by drawing a reverse flow of air through the bed to remove the vapors for delivery with the air to a burner. During the final stages of such a desorption process, the amount of flammable vapors present in the adsorptive bed may be very limited, so that the ultimate overall vapor-air mixture produced by movement of air through the bed is extremely lean and difficult to burn in a conventional burner.

Other situations in which it may be desired to burn a very lean vapor-air mixture include for example sewage disposal installations in which methane gas may be produced but at a relatively low rate or concentration with respect to the amount of air present in admixture with the gas. Unless that flammable gas can be burned, it may be necessary to utilize relatively expensive catalytic or other recovery equipment for preventing polluting escape of the vapors into the atmosphere.

SUMMARY OF THE INVENTION

The present invention provides an improved type of burner in which flammable vapor-air mixtures of the above discussed or other similar types, which under at least some circumstances are very lean and of extremely low B.T.U. content, may be burned very effectively and completely to carbon dioxide and water, so that these ultimate products of combustion can be emitted into the atmosphere without incurring pollution problems. Preferably, the burner is of a character to handle and burn completely vapor-air mixtures whose B.T.U. content varies unpredictably over a very wide range, from the discussed extremely lean condition to a relatively concentrated high B.T.U. content condition.

To accomplish these results, a burner embodying the invention includes a structure forming an upwardly opening recess within which the discussed lean mixture of flammable vapor and air is burned. The mentioned structure has a peripheral side wall which projects upwardly and extends continuously about and defines the recess, with the vapor-air mixture being introduced into a lower portion of that recess through an appropriate inlet or inlet means. The recess containing structure is formed to close the recess at its underside and upwardly along the side wall to a level spaced above that at which the inlet means introduce the vapor-air mixture into the recess, to thus shield the lean mixture from external air about the structure and protect the mixture while it burns with a low flame at least partially in the recess.

For best results, the premixed vapor and air are introduced into the lower portion of the recess in a direction other than upwardly, that is either generally horizontally or perhaps in an initially downward direction, to avoid unwanted upward escape of the mixture and assure its effective burning in the recess before it can rise to the level at which contact with external air is possible. In the currently preferred arrangement, the vapor inlet means include a hollow projection extending upwardly into the recess near its center, and having a closed upper end and circularly spaced apertures through which the vapor-air mixture is emitted laterally into the lower portion of the recess. The structure forming the recess may be shaped essentially as an upwardly opening cup, or plurality of such cups, which may be essentially circular about a vertical axis or axes and have upper edges spaced above the mixture inlets.

At times when the mixture may be richer in character and of higher B.T.U. content, that mixture may rise upwardly within the recess while yet unburned, to a level at which external air may contact and intermix with the initially rich mixture to convert it to a more flammable condition in which a flame at a higher level may be maintained. Thus, the burner structure automatically converts between different operating conditions in correspondence with changes in the B.T.U. content of the input gases, to burn completely and effectively vapor-air mixtures having an extremely wide range of variable B.T.U. content.

BRIEF DESCRIPTION OF THE DRAWING

The above and other features and objects of the invention will be better understood from the following detailed description of the typical embodiments illustrated in the accompanying drawing in which:

FIG. 1 is a diagramatic representation of a service station vapor disposal system embodying the invention;

FIG. 2 is an enlarged vertical section taken on line 2—2 of FIG. 1 through one of the individual burners of the FIG. 1 arrangement;

FIG. 3 is a plan view of the burner taken on line 3—3 of FIG. 2;

FIG. 4 is a plan view of a burner assembly which has been shown in our prior co-pending application Ser. No. 612,781 filed Sept. 12, 1975; and FIG. 5 is a vertical section taken on line 5—5 of FIG. 4.

DESCRIPTION OF THE PREFERRED EMBODIMENTS

FIG. 1 illustrates diagrammatically a vapor combustion furnace or unit 10 to which a mixture of flammable vapors and air is delivered from a vapor collection system 11 which is essentially the same as a collection system disclosed in our prior co-pending application Ser. No. 612,781 except for the deletion in FIG. 1 of certain portions of the apparatus of that prior application in order to simplify the disclosure for present purposes. This vapor collection apparatus 11 as illustrated includes a service station island having one or more fuel dispensing pump assemblies 12 for filling gasoline or other fuel into the tank 13 of a motor vehicle 14. Each pump assembly or fuel dispensing unit 12 receives fuel from one or more underground tanks 15 through a line or lines represented at 16, and contains a pump 17 driven by an electric motor 18. Upon energization of motor 18 by actuation of an element 19, pump 17 forces the flammable fuel from tank 15 through a conventional flexible hose 20 to a dispensing nozzle unit 21 whose discharge end is adapted and dimensioned to project into the filling neck of vehicle tank 13 to deliver fuel thereto. The nozzle unit 21 has the usual manually actuated trigger element 22, which actuates a valve in the nozzle to start and stop the discharge of fuel from the discharge portion of the nozzle assembly.

For removing the fuel vapors from the vicinity of nozzle unit 21 during a dispensing operation, each such nozzle carries a vapor pick-up element which takes suction from a location about the nozzle and delivers vapors to a flexible suction hose 23 extending along and parallel to the corresponding fuel delivery hose 20. In the preferred arrangement, a valve within nozzle unit 21 closes off the flow of vapors into hose 33 except during delivery of liquid through nozzle unit 21.

When the vapor shut-off valve at nozzle 21 is opened, it allows flow of collected vapors from suction hose 23 to a vapor pump 24 driven by a motor 25, which pump acts when in operation to maintain a sub-atmospheric pressure in line 23 and about the nozzle, with the latter then acting to withdraw fuel vapors and some intermixed air from the vicinity of nozzle unit 21, to thus prevent escape of the vapors outwardly past the nozzle during a filling operation. Pump 24 is capable of maintaining a sufficiently rapid flow of air into hose 23 to effectively withdraw all vapors from the vicinity of the nozzle without the necessity for maintaining a seal between the filling neck of tank 13 and the nozzle. The vapor pump may therefore actually draw some air into the tank neck for admixture with the fuel vapors, so that both air and fuel enter the suction line 23. An appropriate drain (not shown) may be connected to the vapor line 26 leading to pump 24, to drain any liquid which may be contained in line 26 back to storage tank 15.

The vapor from the discharge side of pump 24 flows through a line 26', from which it may enter either a line 27 flowing to a first of two adsorption chambers 28 and 29, or a line 30 which connects through a check valve 31 with a vent line 32 extending upwardly from the underground storage tank 15. Check valve 31 passes fluid only in the direction indicated by the arrow in FIG. 1. The upper end of vent line 32 from tank 15 may be connected to a pressure/vacuum vent cap 33, which will discharge vapors from line 32 to the atmosphere in response to the attainment of a predetermined very slightly super-atmospheric pressure within line 32, and which will admit air from the atmosphere into line 32 in response to the development of a predetermined very slight sub-atmospheric pressure in that line.

Line 34, in addition to being connected to the previously mentioned check valve 31, is also connected through an additional opposite flow check valve 35 and connected line 36 to the upper end of adsorption chamber 28. The upper end of the second adsorption chamber 29 is connected through a flame arrester 37 with the atmosphere, with an additional check valve 38 being connected between the upper ends of the two adsorption chambers and permitting flow leftwardly in FIG. 1. The lower ends of the two adsorption chambers 28 and 29 are interconnected by a line 39, connected to the suction line 40 of a second vapor pump 41 driven by a motor 42, so that this vapor pump can take suction from the adsorption chambers.

Each of the adsorption chambers includes an outer hollow shell 43 filled with a mass or bed of an adsorbent substance, such as activated charcoal, capable of adsorbing the flammable gasoline vapors and thereby separating the vapors from any air intermixed therewith, and then permitting the escape of the cleaned air into the atmosphere at 143. At various times, these adsorbed vapors are withdrawn from the adsorbent material by downward flow of clean atmospheric air through the beds and are then burned in the combustion apparatus 10.

This combustion unit 10, with which the present invention is particularly concerned, includes a vertically elongated hollow essentially tubular stack 44 into the lower portion of which air from the outside of the stack may flow through lower side inlets 45, with an updraft of air within the stack carrying the air and combustion products upwardly for discharge from the upper end of the stack through outlets 46, which may be formed in the sides of the upper portion of the stack so that a top wall 47 may extend across the upper end of the stack and shield it against entry of rain, snow, etc. At a location above the level of inlets 45, the stack 44 contains one or more burners 48 (three such burners being typically illustrated), which are connected and supported at their lower ends by a common horizontal inlet tube or header 49 into which premixed flammable vapors and air are delivered from the discharge side of pump 41 through a line 50. As seen in FIGS. 3 and 4, each of these burners 48 is shaped to form at its upper side an upwardly facing recess 51 within which the vapor-air mixture burns under some operating conditions. Extending about and defining the horizontal extent of this recess 51, each burner 48 has an upwardly projecting side wall 52, desirably extending cylindrically about a vertical axis 53 of the burner, and terminating upwardly at an annular upper edge 54 of wall 52 lying essentially within a horizontal plane 55. At its lower edge, the side wall 52 joins integrally with a preferably horizontal bottom wall 56, to the center of which there is connected a vapor-air mixture inlet structure 57.

The inlet structure 57 is hollow and preferably takes the form essentially of a vertical desirably circular tube projecting upwardly at 58 into the interior of recess 51, with the upper end of the tube being closed by a horizontal top wall 59. The tube, which may be formed integrally with bottom wall 56 and side wall 52 as shown, also projects downwardly beneath bottom wall 56 at 60, to connect at 61 to inlet header 49. The vapor-air mixture thus flows upwardly from inlet header 49 into the interior of vertical tubular inlet structure 57, and flows laterally from that structure through a plurality of evenly circularly spaced restricted openings 62 formed in the side wall of the upwardly projecting portion 58 of structure 57. These openings 62 direct and aim the vapor-air mixture laterally from structure 57, in a direction other than upwardly, and preferably directly horizontally outwardly and radially with respect to axis 53 as illustrated, though it is contemplated that perhaps other arrangements might be provided in which the emitted vapor-air mixture might initially be directed downwardly toward bottom wall 56. The bottom wall 56 and side wall 52 are imperforate across the bottom of the cup-shaped burner structure 48, and upwardly at the side of that structure to a level spaced substantially above the level at which apertures 62 emit the vapor-air mixture into the lower portion of recess 51. Preferably these walls are imperforate up to the level 55 of upper edge 54 of the cup, as shown.

During a dispensing operation with the equipment of FIG. 1, pump 24 operates to draw vapors from the dispenser nozzle and discharge the vapors partially through line 30 to the storage tank 15, and partially through line 27 to adsorption chambers 28 and 29, with these vapors passing downwardly through the lower portion of chamber 28 and upwardly through the chamber 29 for adsorption onto the material of the carbon bed, and with discharge of the cleaned air upwardly from the upper end of chamber 29 to atmosphere. Alternatively, some of the vapors may flow through lines 30 and 36 to the upper end of chamber 28, and then flow downwardly through that chamber into line 39, from which they may flow upwardly through chamber 29, to adsorb the flammable vapors onto both of the adsorbent beds. During the dispensing operation and as long thereafter as a burnable mixture is present in burners 48, the burner pump 41 is kept in operation to deliver the vapor-air mixture to the burners, and an igniter diagrammatically represented at 72 is energized as necessary to light the flames. When both of the pumps 24 and 41 are in operation, during a dispensing operation, the pump 41 may draw off some of the vapors from pump 24 through line 40 connecting to line 39. When pump 24 is turned off, at the end of a dispensing operation, pump 41 continues in operation and draws air downwardly from vent 43 through both of the beds 28 and 29 into line 40, to desorb vapors from the adsorbent beds, and pump the intermixed air and vapors through line 50 to burners 48.

As the vapors which have collected on the beds within chambers 28 and 29 are progressively desorbed from those beds, the vapor-air ratio in the mixture within line 40, and the B.T.U. content of that mixture, progressively decrease until ultimately that mixture may become extremely lean. Also, the mixture may under some conditions during a dispensing operation be very lean. When such a lean mixture is being fed to burners 48, that mixture can burn only if protected against admixture with additional air during the burning process. Under such conditions, a very low intensity blue flame or series of flames are maintained in the lower portion of recess 51, as represented at 63 in FIG. 2. The vapor-air mixture as it flows radially outwardly from the small inlet apertures 62 spreads to a cross-section much greater than that of the apertures 62, and thus can slow down considerably as it moves radially outwardly, and then rise very slowly within recess 51. This movement of the mixture within the lower portion of recess 51 is maintained at a rate substantially less than the flame front velocity of the vapor-air mixture, and particularly substantially less than say 1 ½ to 2 feet per second, so that the flame may be produced and maintained at the location 63 of FIG. 2. The geometry of the burner structure, including especially the very small cross-sectional size of apertures 62 relative to the much greater horizontal cross-sectional area of recess 51, is such as to attain the desired slow rate of movement of the vapor-air mixture, less than the flame front velocity of that mixture.

If the mixture becomes richer in flammable vapors, the flame front may rise upwardly within recess 51, as to the level represented at 64 in FIG. 2. The uppermost portion of the flame progressively rises upwardly as the B.T.U. content of the mixture increases, and ultimately to a condition in which the vapors are too rich to burn completely within the interior of recess 51, without the admixture of some additional air thereto. When this condition is reached, some of the vapors rise upwardly to the level 55 of upper edge 54 of the burner cup before being ignited, and when they reach that level are able to intermix with air from the outside of that cup flowing upwardly as indicated at 65 about the periphery of the cup, so that the vapor-air mixture then burns with the flame partially above and partially beneath level 55, and progressively more above that level as the B.T.U. content increases. Thus, the burner converts automatically between two different types of operating conditions, in the first of which a lean vapor-air mixture burns without additional air in the lower portion of recess 51, and in the second of which a richer mixture burns entirely above level 55 and is mixed thoroughly with additional air to reduce its overall B.T.U. content and vapor-air ratio. The pump 41 is selected to maintain an appropriate rate of vapor-air mixture flow to the burners to accomplish this automatic conversion.

It is found that with cup-shaped burners of the illustrated type, combustion of a lean mixture within the bottom of one of the recesses 51 can be maintained reliably down to a vapor-air ratio almost as low as the lower explosive limit of the vapor-air mixture, while the combustion at the upper level in admixture with external air can burn an inlet mixture which is well above the upper explosive limit. As long as the combustibility of the incoming vapor-air mixture from line 50 is above the lower explosive limit and below the upper explosive limit, the flame will burn at least partially in the cup. When the combustability drops to near or below the lower explosive limit, the flame goes out, because it can no longer support combustion, and at that point pump 41 is shut off until the next successive operation of the equipment. When the combustibility of the vapor-air mixture is near or above the upper explosive limit, unburned vapor-air mixture will flow upwards out of the cup, to mix with air from around the cup and produce primarily an upper level flame as discussed. The air movement upwardly around the outside of the cup can be produced by a blower, or can be induced by natural draft from a stack as shown. It is found that with a stack of sufficient height, say 8 feet, the burners of the present type can obtain substantially completely clean combustion with natural draft over a range of heat contents in the inlet vapor-air mixture of 100 B.T.U./ft$^3$ to 1300 B.T.U./ft$^3$.

While the burner cups have been illustrated as circular in horizontal section (FIG. 3), and such circular cups are preferred in most instances, it is contemplated that the burner cups or structures may have other horizontal shapes if desired.

In the burner arrangement of FIGS. 4 and 5, the burner assembly 67 includes three individual burner elements 68 which may be cup-shaped as shown in FIG. 5, and have short inlet tubes 69 projecting upwardly thereinto from line 70 to introduce the vapor-air mixture into the cups. These elements 68 are positioned closely enough together that ingition of one of the elements will cause ignition of all three. The burner assembly 67 is lighted by a spark-type ingitor 71. In FIGS. 4 and 5, the burner cups are curved essentially hemispherically, rather than being of the cylindrical shape previously discussed in connection with FIGS. 2 and 3.

While certain specific embodiments of the present invention have been disclosed as typical, the invention is of course not limited to these particular forms, but rather is applicable broadly to all such variations as fall within the scope of the appended claims.

We claim:

1. Vapor burning apparatus comprising:
   a structure forming a recess which opens upwardly and which has an upwardly projecting peripheral side wall extending about the recess;
   inlet means for introducing into said recess at a lower level therein a mixture of flammable vapor and air which have been premixed before reaching said inlet means;
   said recess being closed against admission of additional air thereinto at the bottom of the recess and upwardly along said side wall to an upper level which is spaced above said level of introduction of the mixture into the recess, at which upper level external air can communicate with the recess; and means for producing said vapor-air mixture and delivering it to said inlet means, and acting to vary the vapor-air ratio thereof between a relatively lean mixture which can support combustion without additional air and burns at least partially within said recess before rising to said upper level and while isolated from external air by said structure, and a relatively rich vapor air mixture which cannot burn without additional air and which rises upwardly within said recess to said upper level while unburned, and then mixes with external air and burns entirely at or above said upper level.

2. Apparatus as recited in claim 1 in which said means for producing and delivering said mixture act in one condition to deliver to said inlet means a lean mixture which burns completely within said recess and before rising to said upper level.

3. Apparatus as recited in claim 2 in which said means for producing and delivering said mixture include a fuel dispensing unit having a nozzle through which flammable fuel is delivered into a tank, and means for withdrawing vapors of said fuel and air in varying proportions from the vicinity of said nozzle and feeding them to said recess through said inlet means.

4. Apparatus as recited in claim 1, in which said inlet means include a unit projecting upwardly into said recess and having a side wall which is apertured to emit said vapor-air mixture laterally from the unit.

5. Apparatus as recited in claim 1, in which said inlet means include a hollow unit projecting upwardly into said recess at a location near the center thereof and having a closed upper end, said unit having a side wall beneath said closed upper end containing a plurality of circularly spaced apertures through which said vapor-air mixture is emitted laterally in different directions into the lower portion of the recess.

6. Apparatus as recited in claim 1, in which said structure is a cup-shaped unit in which said peripheral side wall thereof has an upper edge at said upper level spaced above said level of introduction of the mixture into said recess, and past which upper edge external air from about the peripheral side wall can contact the upwardly moving gases.

7. Apparatus as recited in claim 1, in which said means for producing and delivering said vapor-air mixture include a bed of material which adsorbs flammable vapors, and means for producing a flow of air through said bed to desorb said vapors and produce said vapor-air mixture of varying ratio, and then delivering said mixture to said recess through said inlet means.

8. Apparatus as recited in claim 1, in which said means for producing and delivering said mixture include a fuel dispensing unit having a nozzle through which flammable fuel is delivered into a tank, and means for withdrawing vapors from the vicinity of said nozzle and delivering them to said structure admixed with air in varying proportions.

9. Apparatus as recited in claim 1, in which said inlet means emit said vapor-air mixture into the lower portion of said recess in a direction other than upwardly.

10. Apparatus as recited in claim 9, in which said structure is a cup-shaped unit of circular horizontal section having an upper edge of said peripheral wall at said upper level, said inlet means including a hollow unit projecting upwardly into said recess near the center thereof and closed at its upper end and having circularly spaced openings in a wall of said hollow unit through which said vapor-air mixture is emitted essentially horizontally into the lower portion of said recess.

11. Apparatus as recited in claim 10 in which said means for producing said mixture and delivering it to said inlet means include a fuel dispensing unit having a nozzle through which flammable fuel is delivered into a tank, and means for withdrawing vapors of said fuel from the vicinity of said nozzle and feeding them to said recess through said inlet means in a mixture of variable richness with air.

12. Apparatus as recited in claim 11, in which said means for producing and delivering said mixture include a bed of adsorbent material functioning to temporarily adsorb vapors from the vicinity of said nozzle and from which vapors are subsequently desorbed and fed to said structure admixed with air.

* * * * *